Jan. 27, 1970   FUKUO SHIBATA   3,492,555
ELECTRIC CONTROL ARRANGEMENTS FOR SYNCHRONOUS MACHINES
Filed Feb. 7, 1967   2 Sheets-Sheet 1

INVENTOR
Fukuo Shibata

Jan. 27, 1970  FUKUO SHIBATA  3,492,555
ELECTRIC CONTROL ARRANGEMENTS FOR SYNCHRONOUS MACHINES
Filed Feb. 7, 1967  2 Sheets-Sheet 2
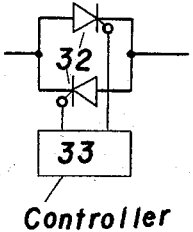
FIG.4  FIG.5
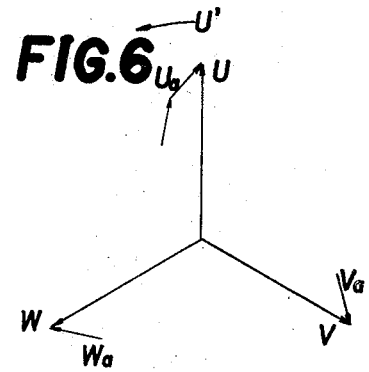
FIG.6
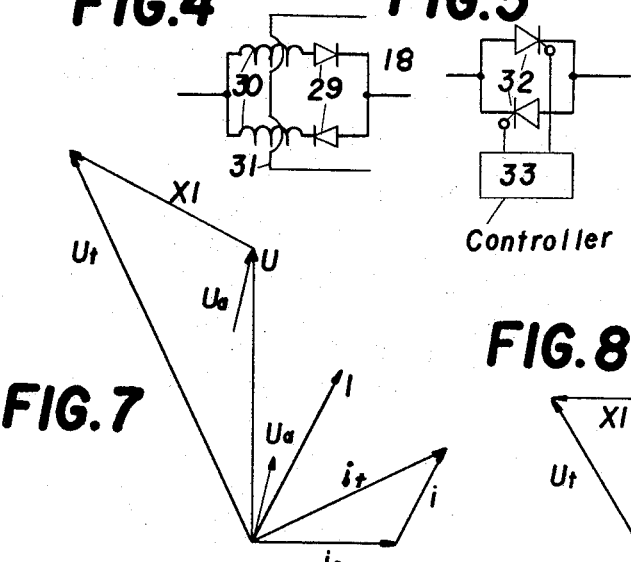
FIG.7
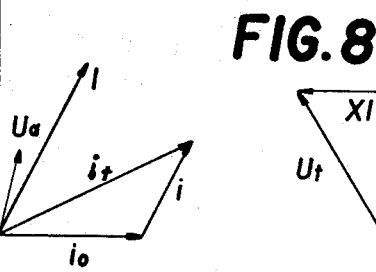
FIG.8
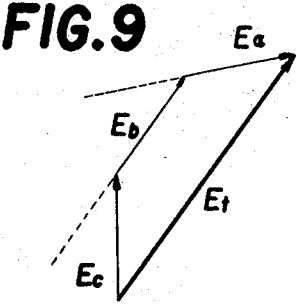
FIG.9
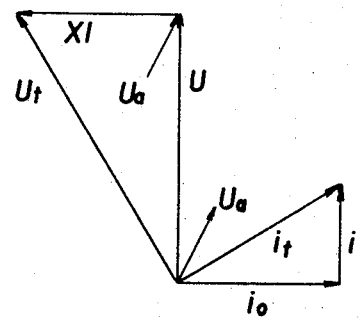
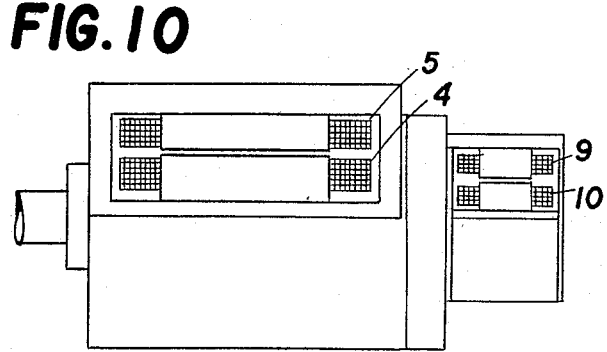
FIG.10
INVENTOR
Fukuo Shibata

United States Patent Office 3,492,555
Patented Jan. 27, 1970

3,492,555
ELECTRIC CONTROL ARRANGEMENTS FOR
SYNCHRONOUS MACHINES
Fukuo Shibata, 13 Tokiwa-cho, Nishinomiya, Japan
Filed Feb. 7, 1967, Ser. No. 614,787
Claims priority, application Japan, Feb. 7, 1966,
41/7,094
Int. Cl. H02p 5/28, 5/40
U.S. Cl. 318—176                                       3 Claims

ABSTRACT OF THE DISCLOSURE

An electric control arrangement for a synchronous machine can be obtained by an arrangement in which there are a rectifier rotating and connected with a field winding of the synchronous machine, exciting means having a primary winding consisting of a first portion and a second portion connected electrically in series with each other and having a secondary winding connected electrically with the rectifier and an electrically closed circuit formed by connecting electrically in series a portion of the armature winding of the synchronous machine and the first portion of the primary winding of the exciting means through an impedance device.

---

This invention relates to electric control arrangements for synchronous machines, and it has particular relation to arrangements relating with brushless synchronous machines. In this invention, it is defined that a synchronous machine is one in which the average speed of normal operation is exactly proportional to the frequency of the system to which it is connected. Examples of synchronous machines are synchronous generators and synchronous motors. A synchronous generator is a synchronous alternating-current machine which transforms mechanical power into electric power. Reversely, a synchronous motor is a synchronous alternating-current machine which transforms electric power into mechanical power. It is generally understood that a synchronous machine has field magnets excited with direct current.

In the brushless synchronous machines here described, the slip-rings of the machines, the commutator of the exciter, and the two sets of brushes have all been completely eliminated. An A.C. exciting system is used instead of the conventional D.C. exciter, its output is rectified by a rectifier mounted on and rotating with the shaft, and is then fed directly into the machine field winding. A brushless machine thus requires no sliprings, commutators, or brushes, and routine maintenance is greatly reduced.

The idea of supplying the excitation of a synchronous machine from an A.C. exciter through rectifiers is by no means new. Many variants of the basic scheme have been put forward in patent applications and in technical literature, and some have been used in actual installations.

However, there are some defects in the well-known brushless synchronous generator having an A.C. exciter excited with D.C. One of the most important defects is that the time recovering from the instantaneous voltage drop owing to the current flowing in the conventional brushless synchronous generator to the normal voltage is rather long compared with that of a self regulating static exciter type generator.

Another defect is that the field circuit of the A.C. exciter becomes rather complicated and expensive because D.C. excitation for the A.C. exciter requires a field rectifier.

These above defects in the well-known brushless synchronous generator were cancelled by a brushless synchronous generator having a rotating-current transformer exciter or an induction machine type exciter.

Here, it is defined that an induction machine is an alternating-current machine in which a primary winding on one member (usually the stator) is connected to the power source and a polyphase or single phase secondary winding on the otther member (usually the rotor) carries induced current.

The basic principle of using an induction machine for supplying rectified field excitation for dynamo electric machines is also not new. In the synchronous machine having an induction machine type exciter, the A.C. generator is a conventional synchronous unit, and the exciter is similar in form to a wound rotor induction motor. The primary or stator winding of the exciter is energized from the generator output. Thus the exciter rotor becomes virtually the secondary of a rotating transformer and its voltage is rectified and applied to the generator field winding.

However, there are some defects in the prior induction machine exciter type brushless synchronous machine. Although the exciter response of the prior induction machine exciter type brushless synchronous machine is faster than that of the conventional brushless synchronous generator having an A.C. exciter excited with D.C., it is still slow.

Another defect is that it is very difficult to maintain the terminal voltage of the prior induction machine exciter type brushless synchronous generator exactly constant between no load and full load, and/or between 1 and 0 of power factor. It is very difficult to settle accurately the relation between the ampere turn of the current coil and of the voltage coil of the exciter primary winding for keeping the constant terminal voltage of the synchronous machine.

In accordance with the present invention very quick response characteristics of the exciter of the brushless synchronous machine having a simple arrangement and characteristic of an accurate constant terminal voltage can be obtained.

In this invention a new induction machine excitation system for synchronous machine has been developed, consisting of an induction machine type exciter. Of course, a rectifier rotating with the rotor of the synchronous machine and being connected electrically with the field winding of the synchronous machine is used. As an example of the said rectifier a semiconductor or metallic rectifier with or without a control element is used, such as a silicon diode rectifier, silicon controlled rectifier.

The invention is characterized by an electric connection for forming an electrically closed circuit between a portion of the winding located at an end of the armature winding of the synchronous machine and the primary winding of the A.C. exciting means (induction machine) through an impedance device and for forming a current winding part in the primary exciting winding through which an alternating current can flow between the said armature winding and an outside electric equipment not through the said impedance device.

The most important object of my invention is to make it possible to provide electric control arrangements relating with brushless synchronous machines when they are used as generators of which the time recovering from the instantaneous voltage drop or variation owing to the current flowing in the armature windings to the normal voltage can be much reduced.

Another important object of my invention is to make it possible to maintain the terminal voltage of the brushless synchronous generators constant between no load and full load, no matter how much the power factor of the load current is, by the simple constructions or arrangements, for instance by the arrangement without automatic voltage regulators or with small automatic voltage regulators.

Still another object of my invention is to make the constructions or arrangements of the brushless synchronous machine simple, therefore to reduce the total cost and space occupied by these sets, even if they are of large current type.

Other objects of my invention will in part be obvious and in part appear hereinafter.

The invention will be better understood from the following description taken in connection with the accompanying drawing and its scope will be pointed out in the appended claim.

Referring to the drawing:

FIG. 4 and FIG. 5 are examples of parts used in the arrangements of my invention.

FIG. 6, FIG. 7, FIG. 8 and FIG. 9 are vector diagrams used for explaining my invention.

FIG. 10 shows an example of a construction or an arrangement of my invention.

Figure 1:
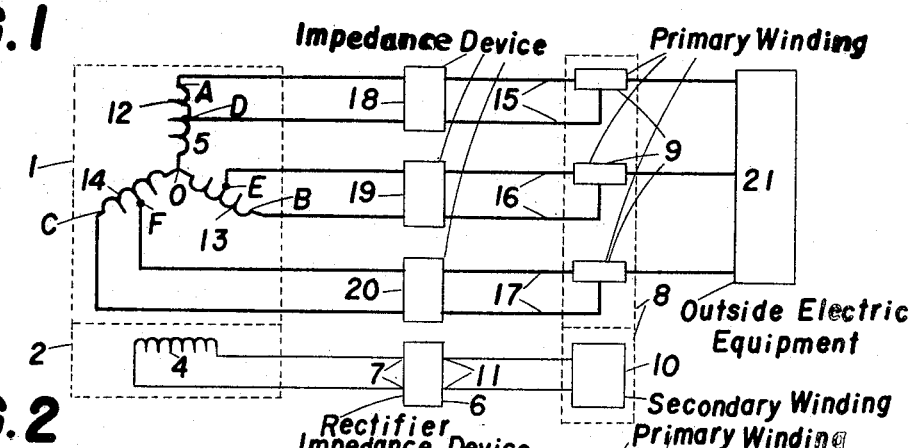
FIG. 1 is a conceptional diagram showing an embodiment of my invention.

As is shown in FIG. 1, an electric machine arrangement of my invention comprises:

A Stator 1 and a Rotor 2 of a Synchronous Machine 3 having a field winding 4 in its Rotor 2 and an armature winding 5 in its stator 1; a Rectifier 6 which rotates with the said rotor 2 of the synchronous machine 3 and whose direct current terminals 7 are electrically connected with the said field winding 4 of the synchronous machine 3; A.C. Exciting Means 8 provided with a primary winding 9 consisting of a first portion (23, 24, 25 shown in FIG. 3) and a second portion (26, 27, 28 shown in FIG. 3) connected electrically in series with each other and provided with a secondary winding 10 which is coupled electromagnetically with the primary winding 9 and is connected electrically with the said rectifier A.C. terminals 11 and is further arranged for rotating with the said rectifier 6 and the said field winding 4; an Outside Electric Equipment 21 which is provided outside of the said synchronous machine 3 is electrically connected with a series connection composed of the said armature winding 5 of the synchronous machine 3 and the said first and second portions (23, 24, 25 and 26, 27, 28 shown in FIG. 3) of the primary winding 9 for A.C. exciting means 8; wherein an electrically closed circuit 15, 16, 17 is formed by connecting electrically in series a portion 12, 13, 14 of the said armature winding 5 of the synchronous machine 3, the first portion (23, 24, 25 shown in FIG. 3) of the said primary winding 9 of the A.C. exciting means 8 and an impedance device 18, 19, 20.

When the synchronous machine 3 is used as a generator, the said outside electric equipment 21 is its load. On the other hand, when the synchronous machine 3 is used as a motor, the said outside electric equipment 21 is its electric source.

It is defined that an impedance device is a device which restricts or impedes the current flowing when a voltage is supplied on its both terminals. Various types of impedance devices can be used to impede the current of the closed circuit 15, 16, 17 such as resistors, inductors, saturable reactors, gating transformers, reactors, controlled rectifiers, magnetic amplifiers. The impedance values of these impedance devices can be either variable or constant. When they are variable, these impedances can be manually controlled or they can be arranged for automatic regulation.

It is only shown in FIG. 1 that the impedance device 18, 19, 20 are inserted between the portion 12, 13, 14 of the armature partial winding 5 and the primary winding 9 of the A.C. exciting means, as FIG. 1 is a conceptional diagram. But, practically the impedance device 18, 19, 20 must be inserted either in the circuit between the end A, B, C of the armature winding 5 of the synchronous machine 3 and the primary winding of the A.C. exciting means 8 or in the circuit between the tap D, E, F of the armature winding 5 and the primary winding 9 of the A.C. exciting means 8. The above matter will be found in an example explained later. However, in either case, it is right to describe that an electrically closed circuit is formed between a portion 12, 13, 14 of the armature winding 5 located at an end of the armature winding 5 and the primary winding 9 of the A.C. exciting means 8 through an impedance device 18, 19, 20, as was explained before.

Figure 2:
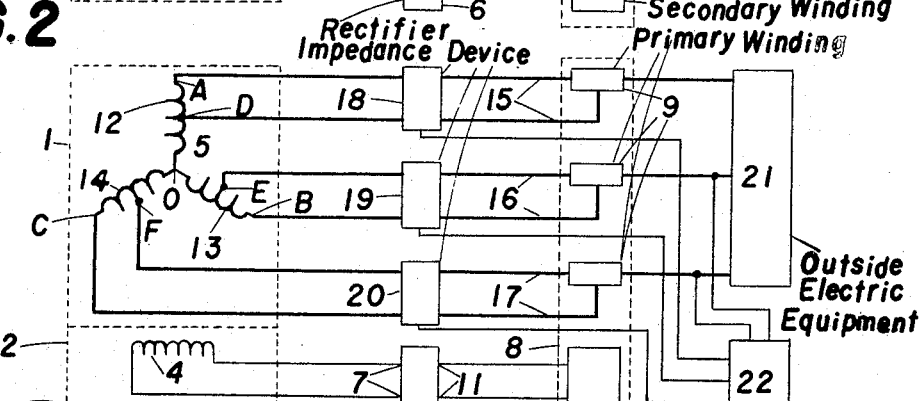
FIG. 2 is a conceptional diagram showing another embodiment of my invention.

In FIG. 2, each impedance device 18, 19, 20 is provided with a controlled element such as a D.C. winding in a saturable reactor or magnetic amplifier, a controlled element and circuit in a silicon controlled rectifier etc. It is shown that each controlled element of the impedance device 18, 19, 20 can be controlled by the controller 22 in which the terminal voltage of the synchronous machine is measured and the error detected by comparing the measured voltage with the standard signal (output measuring device, comparison device and control device are also provided in the controller 22) is used to drive the closed loop automatic control system.

In FIG. 1 and FIG. 2, the secondary winding 10 of the exciting means is arranged for rotating with the rectifier 6 and with the field winding 4.

The A.C. exciting means 8 in FIG. 1 or 2 are composed of constructions similar to those of wound rotor type induction machines. The primary windings 9 of the A.C. exciting means 8 in FIG. 1 or 2 can be polyphase (two phase, three phase or any polyphase) windings similar to those of induction machines or synchronous machines, and also can be single phase windings similar to those of induction machines or synchronous machines. In general, the rotor of the A.C. exciting means 8 in FIG. 1 or 2 are provided with polyphase or single phase windings similar to those of wound rotors of induction machines. Generally, these rotors are wound for the same numbers of poles as the stator in which they are to operate. But, these rotors need not be wound with the same number of phases as the stators, through in general practice three phase machines are used as polyphase machines. For instance, a machine may have a three phase stator and a two phase rotor, or vice versa.

The main purpose of using the stator of the polyphase induction machine in the A.C. exciting means 8 of FIG. 1 or 2 is to produce a rotating field in the stator or the rotor. It is well known that when three balanced currents are taken from three phase armature winding 5 or three phase outside equipment 21, they will produce a magnetomotive force which is constant in magnitude and rotates at synchronous speed. The same effect is produced by a two phase or any polyphase stator winding of the A.C. exciting means 8 of FIG. 1 or 2.

In the A.C. exciting means 8 of FIG. 1 or 2, when the primary winding 9 is similar to that of an induction machine and has the number of poles less than that of the synchronous machine 3 or more than that of the synchronous machine 3, electromotive force is induced in the secondary winding 10 of the A.C. exciting means 8 in FIG. 1 or 2 even if the rotating direction of the revolving field in the A.C. exciting means 8 of FIG. 1 or 2 is same as that of the rotor 10 in FIG. 1 or 2. When the rotating direction of the revolving field in the A.C. exciting means 8 of FIG. 1 or 2 is opposite to that of the rotor 10 in FIG. 1 or 2, the number of poles of the primary winding 9 in FIG. 1 or 2 is not necessarily different to that of the synchronous machine 3. In that case, the number of poles of the primary winding 9 in FIG. 1 or 2 may be equal to, and may be different from that of the synchronous machine 3.

It goes without saying that the number of poles of the A.C. exciting means 8 in FIG. 1 may be either different from, or equal to, that of the synchronous machine 3, when the primary winding 9 of FIG. 1 is a single phase winding.

Figure 3:
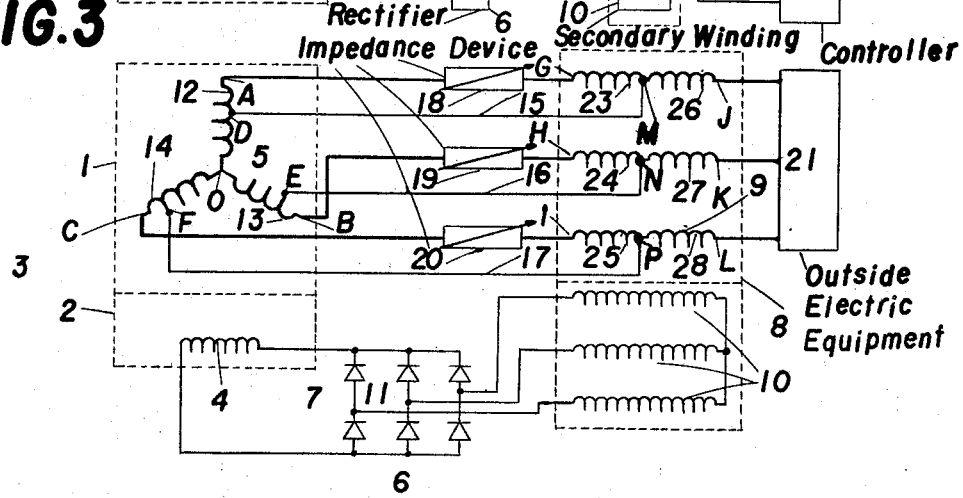
FIG. 3 illustrates diagramatically one embodiment of my invention.

FIG. 3 is a wiring diagram for an embodiment of FIG. 1. In FIG. 3, each impedance device 18, 19, 20 is inserted between each terminal (each end) G, H, I of the primary winding 9 of the exciting means 8 and each terminal (each end) A, B, C of the armature winding 5. The other terminals J, K, L of the primary winding 9 of the exciting means 8 are electrically connected with the outside electric equipment 21. Each tap M, N, P (mid-point or point between the above terminals G and J, H and K, I and L) of the primary winding 9 is electrically connected with each tap D, E, F of the armature winding 5 of the synchronous machine 3. Thus each electrically closed circuit 15, 16, 17 is formed between the portion 12, 13, 14 of the armature winding 5 located at the end A, B, C of the armature winding 5 of the synchronous machine 3 and the first portion 27, 28, 29 in the primary winding 9 of the A.C. exciting means 8 through each impedance device 18, 19, 20. Each second portion 30, 31, 32 in the primary winding 9 of the A.C. exciting means 8 can form a current winding part through which an alternating current can flow between the armature winding 5 (especially OD, OE, OF) and the outside equipment 21 not through the said impedance device 18, 19, 20. The secondary winding 10 of the A.C. exciting means 8 is arranged for rotating with the field winding 4 and the rectifier 6.

FIG. 4 and FIG. 5 show examples of impedance devices 18, 19, 20. FIG. 4 shows controlled saturable reactors 30 with control circuit 31 and rectifiers 29. FIG. 5 shows controlled rectifiers 32 with controller 33.

FIG. 6 shows a vector diagram for synchronous machine 3. The symbols U, V, W are vectors respectively for voltage of each phase of the armature winding 3 of the synchronous machine. The proceeding direction of the vector is counter-clockwise, as shown by the arrow symbol U'. Such counter-clockwise direction is used also for vectors of FIGS. 7, 8 and 9. When the armature winding 5 of the synchronous machine 3 is made of distributed winding, the relation between the terminal voltage $E_I$ and the coil voltage $E_a$, $E_b$, $E_c$ becomes a vector combination such as shown in FIG. 9. We consider only a phase I in phases I, II, III. If the three coils of phase I are now connected in series, the terminal voltage of this phase $E_I = E_a + E_b + E_c$.

In this invention, the armature winding 5 of the synchronous machine 3 is made of distributed winding and is arranged for making the vector of the voltage $U_a$, $V_a$, $W_a$ of an end coil of one phase winding lag behind the vector of the total terminal voltage of this phase. As the vector $i_o$ of the ampere turn for the no-load-voltage winding (for instance, 27, 28, 29 in FIG. 3) of the primary winding lag behind the vector $U_a$, $V_a$, $W_a$ of an end coil of one phase winding by the angle $\theta_1 < 90°$, the ampere turn vector $i_o$ lag behind the total terminal voltage U, V, W of this phase by approximately 90°.

The portion 12, 13, 14 of the armature winding 5 located at the end of the armature winding 5 of the synchronous machine 3 may be either one coil or more than one coil. In any case, if the armature winding is made of distributed winding and is arranged for making the vector of the voltage of an end coil of one phase winding lag behind the vector of the total terminal voltage of this phase, the ampere turn vector $i_o$ for excitation of no load terminal voltage lag behind the total terminal voltage U, V, W of this phase by approximately 90°. When the power factor of the current I of the armature winding 5 of the synchronous machine is cos $\phi$, the ampere turn vector $i$ passing through the winding part of the primary winding of the A.C. exciting means 8 also lag behind the terminal voltage U, V, W by the angle $\phi$.

Thus the total ampere turn $i_t$ for excitation can be obtained in the primary winding 9 of the A.C. exciting means 8. The vector of the voltage drop XI owing to the armature reaction and the leakage reactance has 90° angle difference with the armature current I. As the triangle $i_o i i_t$ of current for excitation can be similar figure to the triangle U XI $U_t$ in which the symbol U shows a terminal voltage, and the symbol $U_t$ shows an induced voltage, the terminal voltage can be maintained at a constant in the condition of the current between no load and full load and/or between the power factor of 1 and 0, when the synchronous machine is used as a generator.

FIG. 10 shows an example of construction or arrangement of my invention. This induction machine type exciting means 8 can be either included in the case of the synchronous machine 3 or provided outside the case of the synchronous machine 3 as shown in FIG. 10.

While these embodiments of my invention hereinbefore illustrated and described performs the objects and provides the advantages previously stated, it may be embodied in various other forms and modifications and it is to be understood, therefore, as not restricted to the specific form hereinbefore set forth but as including variations and modifications thereof coming within the scope of the claims which follow.

I claim as my invention:

1. An Electric Control Arrangement for a synchronous machine which comprises: a Stator and a Rotor of a Synchronous Machine having a field winding in its rotor and an armature winding in its stator; a Rectifier which rotates with the said rotor of the synchronous machine and whose direct current terminals are electrically connected with the said field winding of the synchronous machine; A.C. exciting means provided with a primary winding consisting of a first portion and a second portion connected electrically in series with each other and provided with a secondary winding which is coupled electromagnetically with the primary winding and is connected electrically with the said rectifier A.C. terminals and is further arranged for rotating with the said rectifier and the said field winding; an outside electric equipment which is provided outside of the said synchronous machine and is electrically connected with a series connection composed of the said armature winding of the synchronous machine and the said first and second portion of the primary winding for A.C. exciting means; wherein an electrically closed circuit is formed by connecting electrically in series a portion of the said armature winding of the synchronous machine, the first portion of the said primary winding of the A.C. exciting means and an impedance device.

2. An electric control arrangement for a synchronous machine as claimed in claim 1 in which a terminal of the first portion of the primary winding of the A.C. exciting means is connected electrically with a terminal of the portion of the armature winding of the synchronous machine through the impedance device, and another terminal of the first portion of the primary winding of the A.C. exciting means (a tap of the primary winding of the A.C. exciting means) is connected electrically with a tap of the armature winding of the synchronous machine, further a terminal of the second portion of the A.C. exciting means is connected electrically with the outside electric equipment.

3. An electric machine arrangement as claimed in claim 1 in which the armature winding of the synchronous machine is made of distributed winding and is arranged for making the vector of the voltage of an end coil of one phase winding lag behind the vector of the total terminal voltage of this phase.

References Cited
UNITED STATES PATENTS

| | | | |
|---|---|---|---|
| 3,098,959 | 7/1963 | Rosenberry | 318—181 |
| 3,100,279 | 8/1963 | Rohner | 318—167 |
| 3,308,362 | 3/1967 | Neumann et al. | 318—176 |
| 3,350,613 | 10/1967 | Brockman et al. | 318—193 XR |
| 3,354,368 | 11/1967 | Williamson | 318—193 XR |
| 3,381,195 | 4/1968 | Hoffmann | 318—193 XR |

ORIS L. RADER, Primary Examiner

GENE RUBINSON, Assistant Examiner

U.S. Cl. X.R.

318—181, 193